US011568434B2

(12) United States Patent
Bax et al.

(10) Patent No.: US 11,568,434 B2
(45) Date of Patent: Jan. 31, 2023

(54) SYSTEMS AND METHODS FOR EXECUTING FEEDBACK ACTIONS BASED UPON VEHICLE PRACTICES

(71) Applicant: VERIZON PATENT AND LICENSING INC., Basking Ridge, NJ (US)

(72) Inventors: Eric Theodore Bax, Sierra Madre, CA (US); Kimberly Williams, Burbank, CA (US); Lisa Giaffo, Pasadena, CA (US); John Donald, Los Angeles, CA (US); Teppo Veikko Salonen, Temple City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 213 days.

(21) Appl. No.: 15/906,218

(22) Filed: Feb. 27, 2018

(65) Prior Publication Data
US 2019/0266629 A1   Aug. 29, 2019

(51) Int. Cl.
*G06Q 30/02* (2012.01)
*G06Q 40/08* (2012.01)
*G06Q 50/00* (2012.01)
*B60Q 9/00* (2006.01)

(52) U.S. Cl.
CPC ........... *G06Q 30/0215* (2013.01); *B60Q 9/00* (2013.01); *G06Q 40/08* (2013.01); *G06Q 50/01* (2013.01)

(58) Field of Classification Search
CPC ........... G06Q 30/02; G06Q 40/08; B60Q 9/00
USPC .......................................................... 705/4
See application file for complete search history.

(56) References Cited

U.S. PATENT DOCUMENTS

| 9,135,803   | B1* | 9/2015  | Fields ................. B60K 28/066 |
| 9,180,908   | B2* | 11/2015 | Van Dan Elzen ....... B62D 6/00 |
| 9,645,577   | B1* | 5/2017  | Frazzoli .......... B60W 30/18163 |
| 9,691,298   | B1* | 6/2017  | Hsu-Hoffman ...... G09B 19/167 |
| 9,858,832   | B1* | 1/2018  | Hsu-Hoffman ...... G09B 19/167 |
| 10,373,257  | B1* | 8/2019  | Iqbal ...................... G06Q 40/08 |
| 10,449,967  | B1* | 10/2019 | Ferguson .............. B60W 40/09 |
| 10,643,477  | B2* | 5/2020  | Hodges ................. G07C 5/008 |
| 10,909,629  | B1* | 2/2021  | Madigan ............. B60R 16/0232 |
| 10,916,075  | B1* | 2/2021  | Webster ............... G09B 19/167 |
| 2009/0109037 | A1* | 4/2009  | Farmer ................ G06Q 20/102 340/576 |
| 2010/0299001 | A1* | 11/2010 | Suzuki .................. H04W 88/02 701/2 |
| 2012/0072240 | A1* | 3/2012  | Grosso .................. G06Q 40/02 705/4 |
| 2012/0323690 | A1* | 12/2012 | Michael ................ G06Q 30/02 705/14.58 |

(Continued)

*Primary Examiner* — Ayal I. Sharon (57) ABSTRACT

One or more computing devices, systems, and/or methods for executing feedback actions based upon vehicle practices are provided. For example, sensor data is collected from sensors configured to collect sensor data associated with vehicles. The sensor data is synthesized to attribute sensor data to vehicle motion of the vehicle in relation to other objects. The vehicle motion is synthesized to determine driving actions of the vehicle, such as switching lanes, making a left hand turn, running a red light, etc. Vehicle practices of the vehicle are defined based upon the driving actions, such as a vehicle practice of a driver running red lights. A feedback action is executed to either reward the vehicle practices or incentivize a change in the vehicle practices.

20 Claims, 8 Drawing Sheets

(56) References Cited

U.S. PATENT DOCUMENTS

| | | | | |
|---|---|---|---|---|
| 2013/0090821 A1* | 4/2013 | Abboud | ............... | G07C 5/085 |
| | | | | 701/70 |
| 2013/0297387 A1* | 11/2013 | Michael | ............ | G08G 1/0112 |
| | | | | 705/13 |
| 2013/0332004 A1* | 12/2013 | Gompert | ............... | G07C 5/02 |
| | | | | 701/1 |
| 2014/0113619 A1* | 4/2014 | Tibbitts | ............... | B60W 40/09 |
| | | | | 455/419 |
| 2014/0128146 A1* | 5/2014 | Story, Jr. | ................ | A63F 9/24 |
| | | | | 463/36 |
| 2014/0180723 A1* | 6/2014 | Cote | .................... | G07C 5/008 |
| | | | | 705/4 |
| 2014/0195272 A1* | 7/2014 | Sadiq | ............... | G06Q 40/08 |
| | | | | 705/4 |
| 2015/0254955 A1* | 9/2015 | Fields | .................. | G08B 21/02 |
| | | | | 705/4 |
| 2016/0117928 A1* | 4/2016 | Hodges | ............ | G06F 3/04842 |
| | | | | 701/99 |
| 2016/0288797 A1* | 10/2016 | Takahashi | ........... | G07C 5/0808 |
| 2016/0293011 A1* | 10/2016 | Erlich | .................... | G08G 1/20 |
| 2017/0140652 A1* | 5/2017 | Hodges | ............ | G06F 3/04842 |
| 2017/0263120 A1* | 9/2017 | Durie, Jr. | .............. | G08G 1/205 |
| 2017/0365165 A1* | 12/2017 | Landfors | ............. | G06F 16/182 |
| 2019/0019122 A1* | 1/2019 | Allen | .................. | G06Q 10/063 |
| 2019/0266629 A1* | 8/2019 | Bax | ....................... | G06Q 40/08 |
| 2021/0166323 A1* | 6/2021 | Fields | ................. | H04W 4/024 |
| 2021/0287462 A1* | 9/2021 | Taylor | ............... | G07C 5/0858 |

\* cited by examiner

SYSTEMS AND METHODS FOR EXECUTING FEEDBACK ACTIONS BASED UPON VEHICLE PRACTICES

BACKGROUND

Many drivers consciously or unknowingly drive in a manner that is unsafe or that reduces the flow of traffic. For example, a driver may follow too close behind another vehicle, which can result in a rear-end accident because the driver may be unable to stop their vehicle in time if the vehicle in front quickly slows down. Tailgating, frequently switching lanes, not slowing down to allow other vehicles to merge, and/or other driver behaviors may seem to improve that driver's commute time, but ultimately slows down the overall flow of traffic and can lead to serious accidents. Some drivers may be unaware of their unsafe driving behaviors, such as where drivers never realize that they are involved in near-miss accidents. Thus, there is a need to improve technological processes for improving traffic safety and traffic flow.

SUMMARY

In accordance with the present disclosure, one or more computing devices and/or methods for executing feedback actions based upon vehicle practices are provided. In one embodiment, connections are established with sensors configured to collect sensor data associated with one or more vehicles (e.g., a local connection to a sensor integrated into a computer establishing a connection with the sensor, a remote connection, a wired connection, a wireless connection, etc.). The sensors may comprise vehicle mounted sensors, sensors installed within a road, road-side sensors, sensors within a mobile device of a driver/passenger, sensors mounted to a drone, and/or any other type of sensors. A sensor may comprise a camera, a motion sensor, a distance sensor, a vehicle speed sensor, an accelerometer, a gyroscope, a turn signal status sensor, a wiper blade status sensor, and/or any other type of sensor that can collect sensor data used to identify motion of a vehicle or operational properties of the vehicle. In this way, transmissions of sensor data are received over the connections from the sensors.

The sensor data is synthesized to attribute the sensor data to vehicle motion of the vehicle in relation to other objects, such as other vehicles, a lane, a road, a sidewalk, a traffic signal, etc. The sensor data may be synthesized by evaluating the sensor data to determine how the sensor data is indicative of motion of the vehicle, such as where a sequence of camera images depict the vehicle changing lanes, where a sequence of speed values indicate the vehicle coming to a stop, where a sequence of motion values and distance values indicate a turning motion (e.g., the user made a right hand turn), etc. Various types of analysis (e.g., image analysis), statistical/probabilistic models, neural networks, mapping data structures that map types of sensor data and sensor data values or changes thereof to vehicle motion, and/or machine learning techniques may be used to identify vehicle motion based upon sensor data.

The vehicle motion is synthesized to determine driving actions of the vehicle. For example, a right hand turn of the vehicle may be determined based upon the turning vehicle motion. In another example, a vehicle changing from a left hand lane to a right hand lane while in an intersection may be determined based upon the vehicle changing lanes vehicle motion. Various types of analysis, models, neural networks, mapping data structures, and/or machine learning techniques may be used to identify driving actions from vehicle motion.

Vehicle practices of the vehicle in relation to vehicle practices of other vehicles and/or absolute/predefined vehicle practices are determined based upon the driving actions. A vehicle practice may correspond to a single instance or multiple instances of driving actions that are indicative of a driving habit of a driver of the vehicle. For example, a vehicle practice of routinely not using a turn signal to merge may be determined based upon driving actions indicating that the vehicle merged lanes without using a turn signal.

A feedback action may be determined for either rewarding the vehicle practices (e.g., good vehicle practices such as routinely using a turn signal, allowing adequate distance between the vehicle and a vehicle in front of the vehicle, etc.) or incentivize a change in the vehicle practices (e.g., punishments or incentives to stop unsafe vehicles practices or vehicle practices that slow the overall traffic flow such as frequent lane switching). The feedback action may reward a driver or owner of the vehicle in terms of a monetary reward, access to a premium parking space, access to a restricted road or lane, reduced tolls, social media praise, insurance premium adjustments, etc. The feedback action may incentivize a change in the vehicle practices by charging a fee to the driver or owner, increasing toll costs, increasing insurance premiums, etc.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
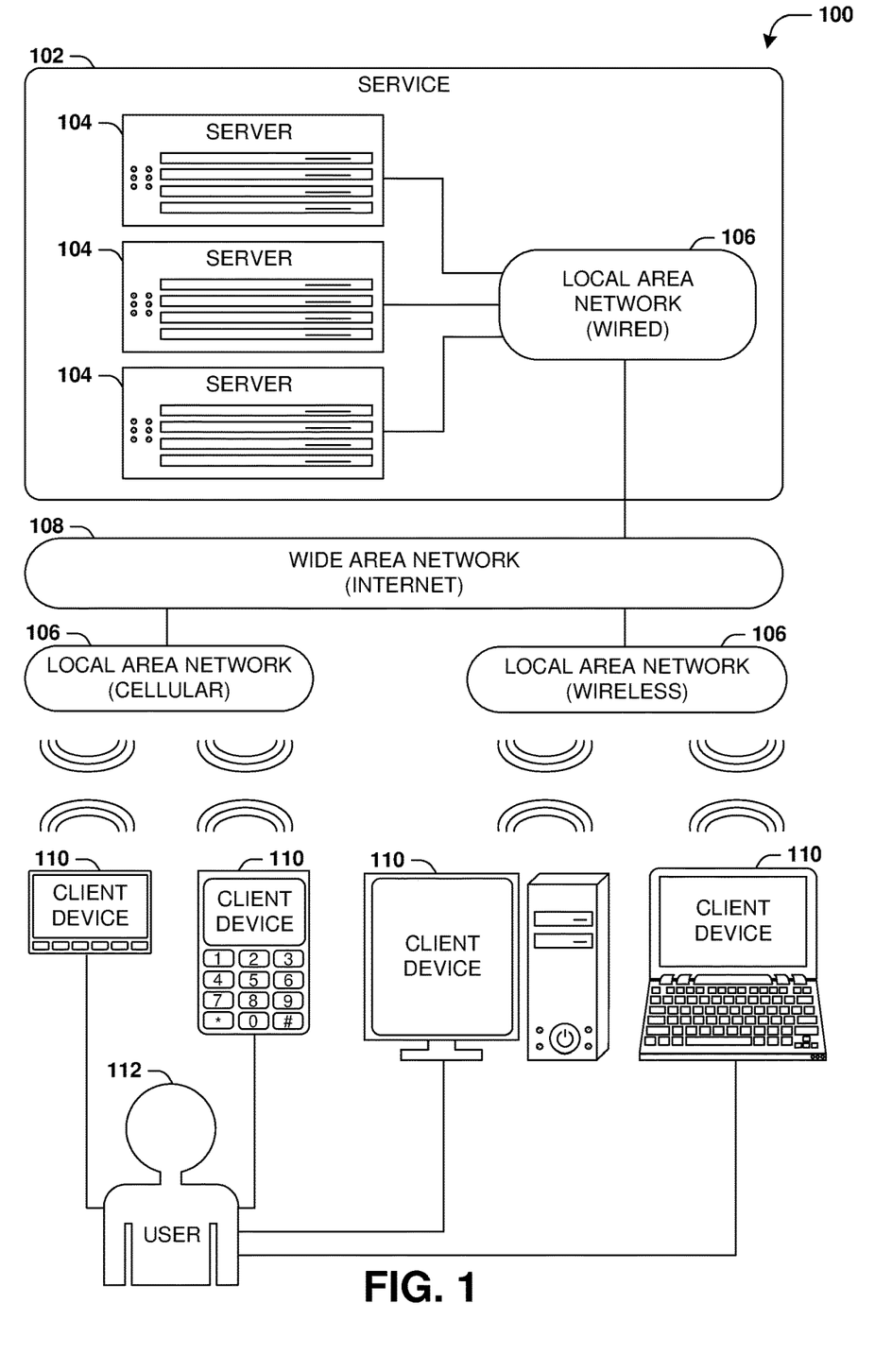
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
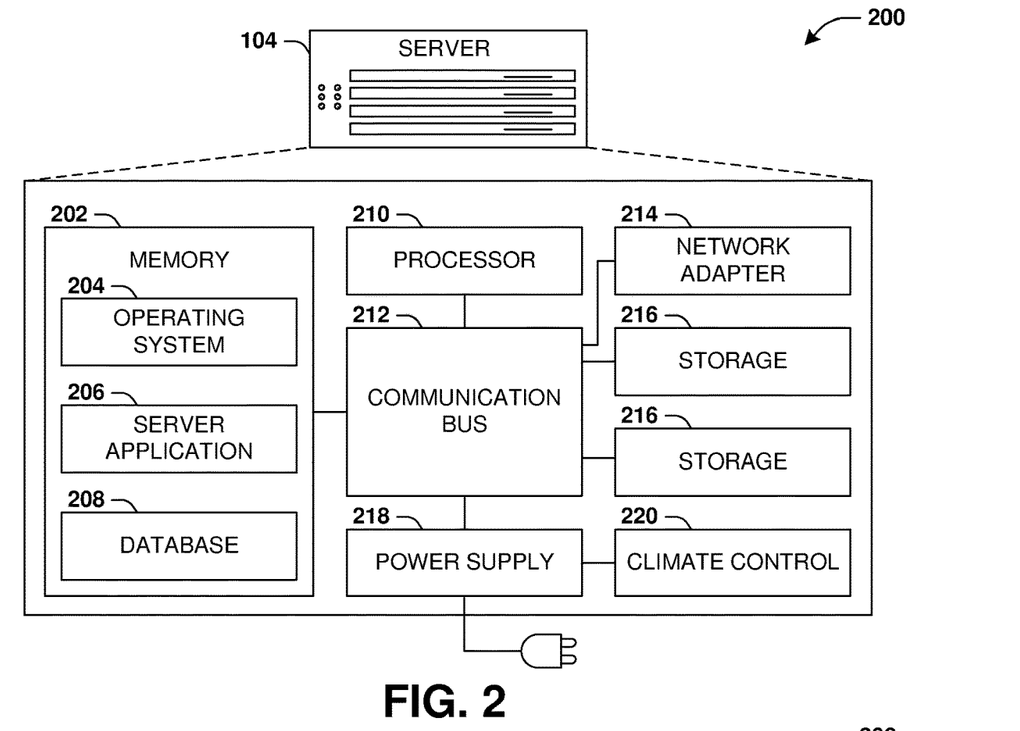
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
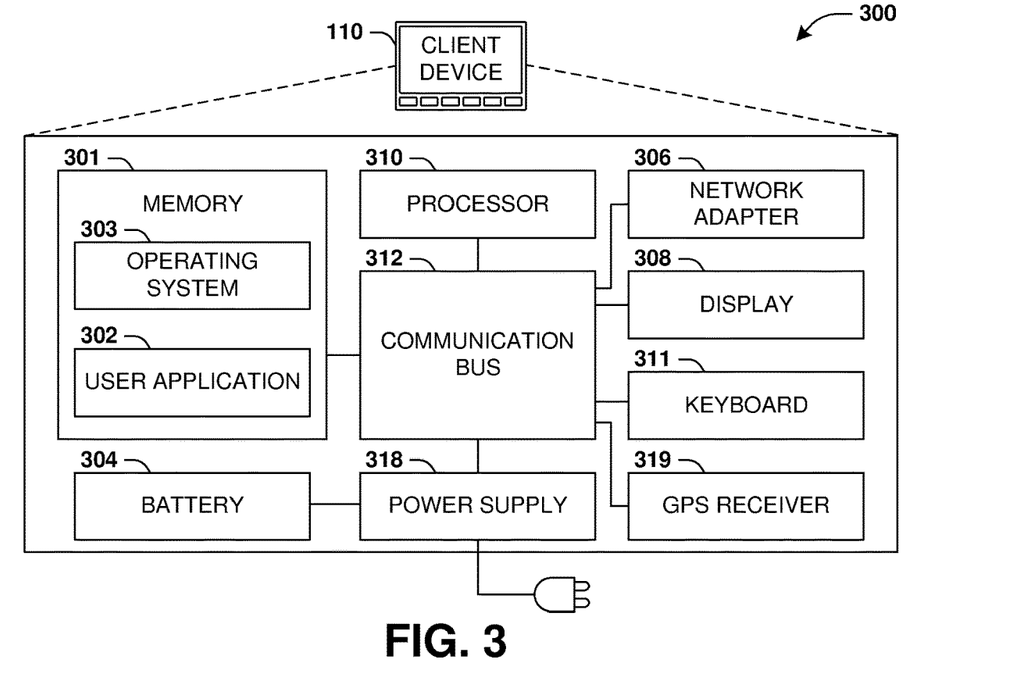
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for executing feedback actions based upon vehicle practices are provided. In particular, current technological processes of improving overall traffic safety and traffic flow, such as through traffic signals, traffic light actuators, backup cameras, vehicle distance warning devices, etc., are improved by the execution of feedback actions by computers to reward good driving behaviors and incentivize changing bad driving behaviors.

Figure 4:
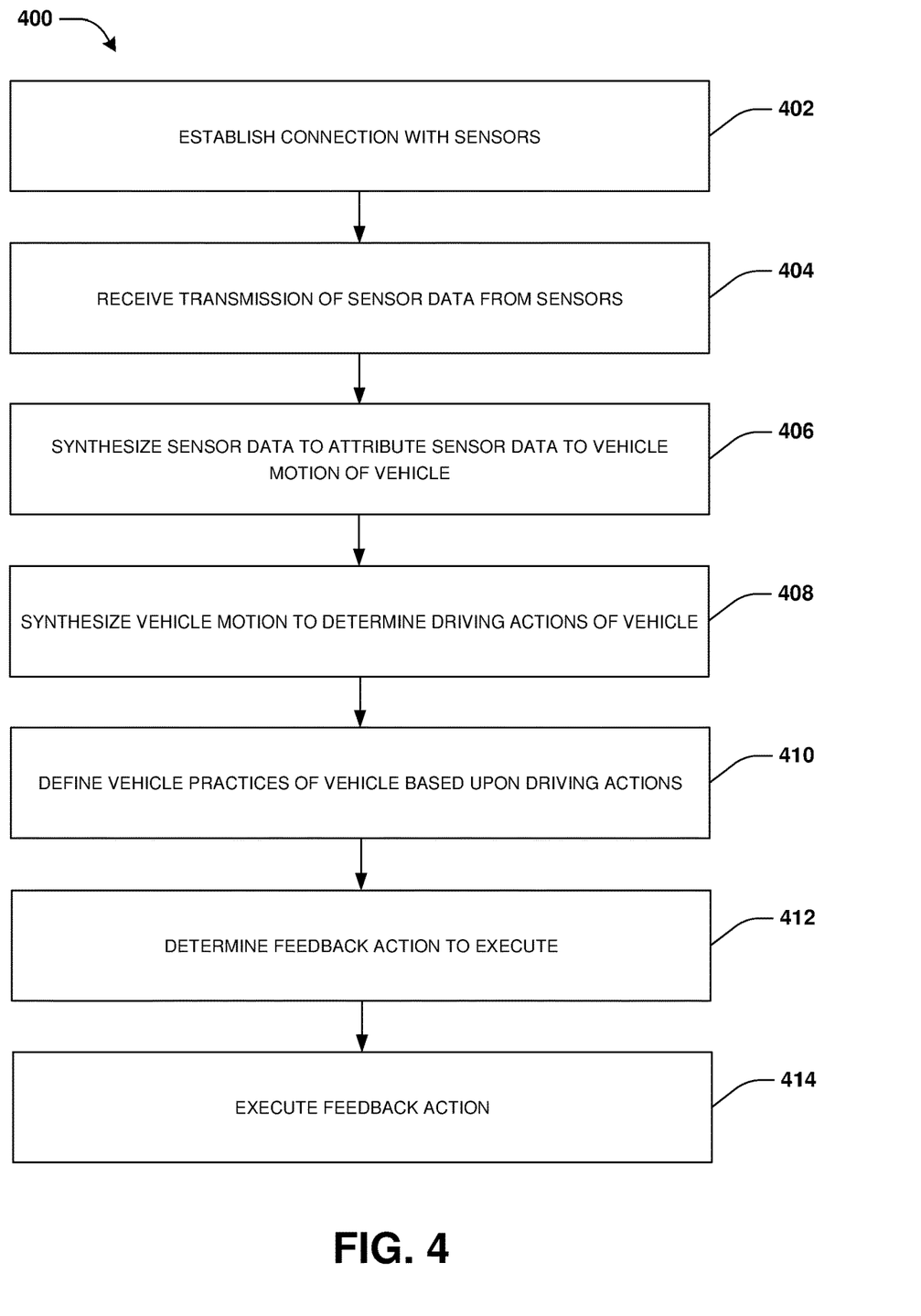
FIG. 4 is a flow chart illustrating an example method for executing feedback actions based upon vehicle practices.

An embodiment of executing feedback actions based upon vehicle practices is illustrated by an example method 400 of FIG. 4. The example method 400 may be executed by a computer, such as a vehicle computer of a vehicle, a mobile device (e.g., a phone, smart watch, or other device of a driver of the vehicle), a remote computer (e.g., a server configured to receive telemetry and/or other sensor data from the vehicle over a computer network), etc. At 402, connections are established with sensors configured to collect sensor data associated with one or more vehicles. For example, the vehicle computer (or any other type of computer executing the method 400) may establish connections with vehicle sensors, such as cameras, a control area network (CAN) bus for speed data, turn signal status data, wiper blade status data, and/or other vehicle operation data, distance sensors, motion sensors, etc. In another example, the vehicle computer may establish a connection with a mobile device of a driver to obtain sensor data from sensors of the mobile device, such as GPS data, gyroscope data, accelerometer data, etc. In another example, the vehicle computer may connect to a remote server or remote device to obtain sensor data, such as from a traffic light, a road-side sensor, a road sensor, etc. Various types of connections can be made, such as a wired connection, a wireless connection (e.g., Bluetooth, a wireless network connection, a radio frequency (RF) connection, etc.), a local connection (e.g., the sensor may be integrated into the computer performing the method 400), etc.

At 404, transmissions of sensor data are received over the connections from the sensors. For example, vehicle speed measurements, whether a turn signal is on or off, images, crash sensor data, distance data between the vehicle and other objects, road condition data, temperature, weather data, and/or a wide variety of other data can be received.

At 406, the sensor data is synthesized to attribute sensor data to vehicle motion of the vehicle, such as motion of the vehicle in relation to other objects (e.g., a road, a lane, a traffic light, another vehicle, a curb, a deer, etc.). Various techniques may be used to synthesize the sensor data to identify vehicle motion of the vehicle. In one example, a model correlating types of sensor data and sensor data values or changes thereof to vehicle motion may be used (e.g., the model may correlate a turn signal being on, a slow decrease in speed values, and images depicting an intersection to a vehicle motion of the vehicle slowing down to make a left hand turn). Machine learning techniques, a mapping data structure mapping sensor data to types of vehicle motion, and/or other techniques may also be used to identify vehicle motion from sensor data. Vehicle motion may describe motion of the vehicle, such as speed, acceleration, merging between lanes, crashing, bumping into an object, turning, moving in reverse, driving a certain distance from another vehicle, moving away from or towards an object, etc.

At 408, the vehicle motion is synthesized to determine driving actions of the vehicle. Various techniques may be used to synthesize the vehicle motion to identify driving actions. In one example, a model correlating types of vehicle motion to driving actions may be used (e.g., the model may correlate a left turning motion as the vehicle turn left at an intersection; the model may correlate a rapid slowing down motion as the vehicle stopping at a red light; etc.). Machine learning techniques, a mapping data structure mapping types of vehicle motion to types of driving actions, and/or other techniques may also be used to identify driving actions from vehicle motion. Driving actions may describe actions taken by a driver or autonomous driving functionality, such as stopping at a light, merging into a lane, blocking another vehicle from merging, driving below the speed limit, driving too close to another vehicle, having a near-miss accident, hitting an object, weaving into another lane while turning at a two lane turning intersection, weaving between lanes, frequently switching lanes, forgetting to turn a turn signal off, etc.

At 410, vehicle practices of the vehicle (e.g., driver practices/habits of the driver) are defined in relation to vehicle practices of other vehicles and/or predefined/absolute vehicle practices (e.g., vehicle practices labeled as safe, unsafe, resulting in increased traffic flow, resulting in decreased traffic flow, ideal/desired vehicle practices, non-ideal vehicle practices, etc.) based upon the driving actions. In one embodiment, a vehicle practice is defined based upon a single instance of a driving action (e.g., a running red light vehicle practice identified based upon a driving action indicating that the vehicle ran a red light) or after a threshold number of instances of a driving action (e.g., driving actions indicating that the driver routinely runs stop signs). Vehicle practices may describe various driving habits of a driver and/or a frequency at which such driving habits occur (e.g., a single instance, 10% of trips, a number of occurrences over a period such as a month, etc.), such as routinely not keeping a safe distance from a car in front, an instance of running a stop sign, leaving a turn signal on while driving on the expressway, etc.

At 412, a feedback action to execute to either reward the vehicle practices (e.g., reward safe driving habits and/or driving habits that help the overall traffic flow) or incentivize a change in the vehicle practices (e.g., punish unsafe driving habits and/or driving habits that impede the overall traffic flow) is determined. In one embodiment, a mapping structure that maps vehicle practices to feedback actions may be evaluated to identify a feedback action mapped to a vehicle practice of the vehicle. In another embodiment, a driver or owner of the vehicle may have signed up for certain feedback actions to be performed to certain vehicle practices.

At 414, the feedback action is executed, such by the computer implementing the method 400 (e.g., executed by the vehicle computer, executed by the mobile device, executed by a remote computing device, etc.). In one embodiment, the computer transmits a monetary charge command over a computer network to a remote computing device (e.g., a bank server) to deduct an amount of money from an account of a user associated with the vehicle. In another embodiment, a monetary payment command is transmitted by the computer over the computer network to the remote computing device to add an amount of money to the account of the user.

In another embodiment, a driving action recommendation for the driver to implement the change in the vehicle practices is generated. The driving action recommendation may describe what driving action is problematic, how to avoid performing the driving action in the future, and/or include other informative or instructional information (e.g., a video showing a safer driving action, information on insurance cost increases if the driving action continues and/or if an accident is caused by the driving action, etc.). Subsequent vehicle practices of the driver may be evaluated to determine whether the driver implemented the change to the vehicle practices. A message may be outputted (e.g., rendered on a display, an audio message played through a speaker, sent as an email, text, or social network post, etc.) regarding whether the driver implemented the change or not. In one example, a more severe feedback action may be executed if the driver failed to implement the change (e.g., a larger fine).

In another embodiment, the feedback action is executed to provide the vehicle with authorization to access a restricted parking space (e.g., a premium/reserved parking space), a restricted road, or a restricted lane. For example, authorization may be transmitted over a computer network to a remote computing device that manages the parking space, road, or lane. In another embodiment, the feedback action is executed to either increase or decrease an amount of a toll to charge the vehicle for traveling a toll road. In another embodiment, the feedback action may be executed to post a social network post describing how the user implemented desired driving practices.

In another embodiment, the vehicle practices are evaluated to determine an insurance adjustment (e.g., an increase or decrease to an insurance premium) to implement for an insurance policy on the vehicle. The feedback action may be executed to transmit an adjustment command over a computer network to a remote computer device to adjust the insurance policy based upon the insurance adjustment. In another embodiment, the vehicle practices are evaluated to determine a probability of an accident (e.g., a mapping structure or a statistical model may be used to determine the probability of the accident based upon a type of vehicle practice (e.g., running a red light vs leaving a turn signal on) and/or a severity and/or frequency of the vehicle practice (e.g., does the driver frequently run red lights that have been red for over 4 seconds)). A message of the probability of an accident may be outputted, such as through an audio message, a rendered message on a display, or transmission of a text, email, or other type of message to the user.

In one embodiment, a determination is made that the vehicle is an autonomous vehicle that implements autonomous driving functionality. Vehicle practices of the vehicle attributed to the implementation of the autonomous driving functionality are evaluated to generate a recommendation of how to adjust the autonomous driving functionality to implement the change in the vehicle practices (e.g., the autonomous vehicle may be currently set to a mode that follows the black letter law of the road and implements driving practices that minimize compute time for this particular vehicle, but can lead to riskier driving or impede the flow of traffic of other vehicles such as due to frequent lane switching). The recommendation may be outputted, such as through an audio message, a rendered message on a display, or transmission of a text, email, or other type of message to the user. In an example, the vehicle practices attributed to the implementation of the autonomous driving functionality are evaluated to identify a malfunction of the autonomous vehicle, such as a malfunctioning or broken sensor. An alert message of the malfunction may be outputted, such as through an audio message, a rendered message on a display, or transmission of a text, email, or other type of message to the user.

In one embodiment, a first mapping that maps traffic metrics to vehicle practices is created. A traffic metric may correspond to a safety metric (e.g., a 10% reduction in traffic accidents over the next 6 months), a traffic flow metric (e.g., a 1 mph increase in traffic flow for a certain highway), and/or other types of metrics/goals. The first mapping may indicate a relationship/correlation between how (e.g., how much, a likelihood of affecting, etc.) a vehicle practice affects a traffic metric (e.g., a prediction of how much traffic accidents increase when drivers frequently switch lanes). A second mapping that maps vehicle practices to feedback actions is created. The second mapping may indicate a relationship/correlation between how (e.g., how much, a likelihood of affecting, etc.) a feedback action affects a vehicle practice (e.g., a prediction of how likely a fee or insurance premium increase of a certain amount will cause a driver to stop/avoid frequent lane switching). A neural network may be utilized to evaluate the first mapping and the second mapping to determine an adjustment to the feedback actions that will achieve the traffic metrics (e.g., how much the fee should be increased to stop a number of drivers from frequently switching lanes that will reduce traffic accidents by 10%). In this way, the feedback action may be adjusted based upon the adjustment to create an adjust feedback action for subsequent execution.

In one embodiment, the feedback action can be adjusted based upon traffic condition information obtained over a network from a remote computing device (e.g., a larger fine may be imposed for unsafe driving during a snow storm). In another embodiment, the feedback action can be adjusted based upon wealth or other demographic information about the user (e.g., charge a large enough fine that a driver could care). In another embodiment, the feedback action can be adjusted based upon a current location of the vehicle (e.g., a larger fine if the vehicle is in a school zone, in a residential neighborhood, etc.).

In one embodiment, the vehicle practices of the vehicle are evaluated to construct a challenge to improve the vehicle practices (e.g., a challenge to not run stop signs for 70 days). A reward for completing the challenge may be constructed (e.g., access to a premium parking space at work). Subsequent vehicle practices of the driver may be monitored to determine whether the driver completed the challenge, and thus will receive the reward.

In one embodiment, vehicle practices of a plurality of users is evaluated to identify a group of users having driving practices above a safety threshold. A safe driver group (e.g., a social network group, a group of users of a service or website, etc.) is created to comprise the group of users. The users of the safe driver group may be provided with access to information about the users through a user interface. For example, vehicle practices of users may be provided through the user interface, users may create and track challenges to improve driving practices through the user interface, etc.

Figure 5:
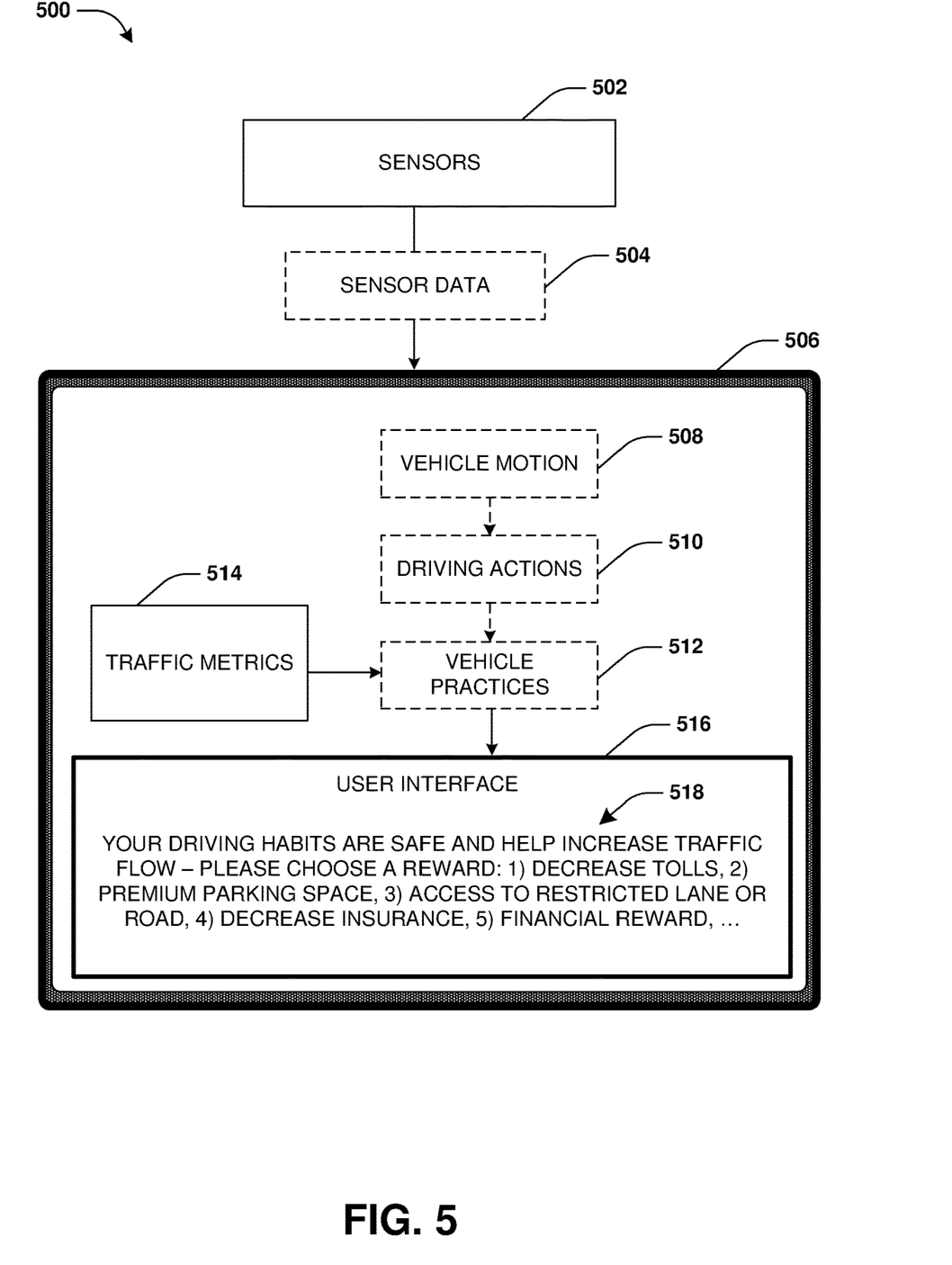
FIG. 5 is a component block diagram illustrating an example system for executing feedback actions based upon vehicle practices, where a reward is provided.

FIG. 5 illustrates an example of a system 500 for executing feedback actions based upon vehicle practices. A computing device 506 may obtain sensor data 504 from sensors 502 configured to collect the sensor data 504 associated with one or more vehicles, such as a vehicle associated with the computing device 506 (e.g., a mobile device within the vehicle, a vehicle computer of the vehicle, etc.). The computing device 506 processes the sensor data 504 to identify vehicle motion 508 of the vehicle, such as turning characteristics of the vehicle making left hand turns. The computing device 506 processes the vehicle motion 508 to identify driving actions 510, such as the vehicle staying within a turning lane while turning. The computing device 506 processes the driving actions 510 to determine vehicle practices 512, such as a vehicle practice where a driver of the vehicle routinely makes safe left hand turns without leaving turning lanes. The vehicle practices 512 may be compared to traffic metrics 514, such as a safety traffic metric to reduce collisions in intersections cause by improper turns, to determine that a feedback action to reward the driver should be provided. Accordingly, the computing device 506 renders a user interface 516 comprising a list of rewards 518 from which the driver can choose, such as a decreased toll reward, access to a premium parking space, access to a restricted lane or road, a decreased insurance premium, a financial reward, etc. In response to receiving a selection of a reward through the user interface 516, the computing device 506 may execute a feedback action to implement the selected reward.

Figure 6:
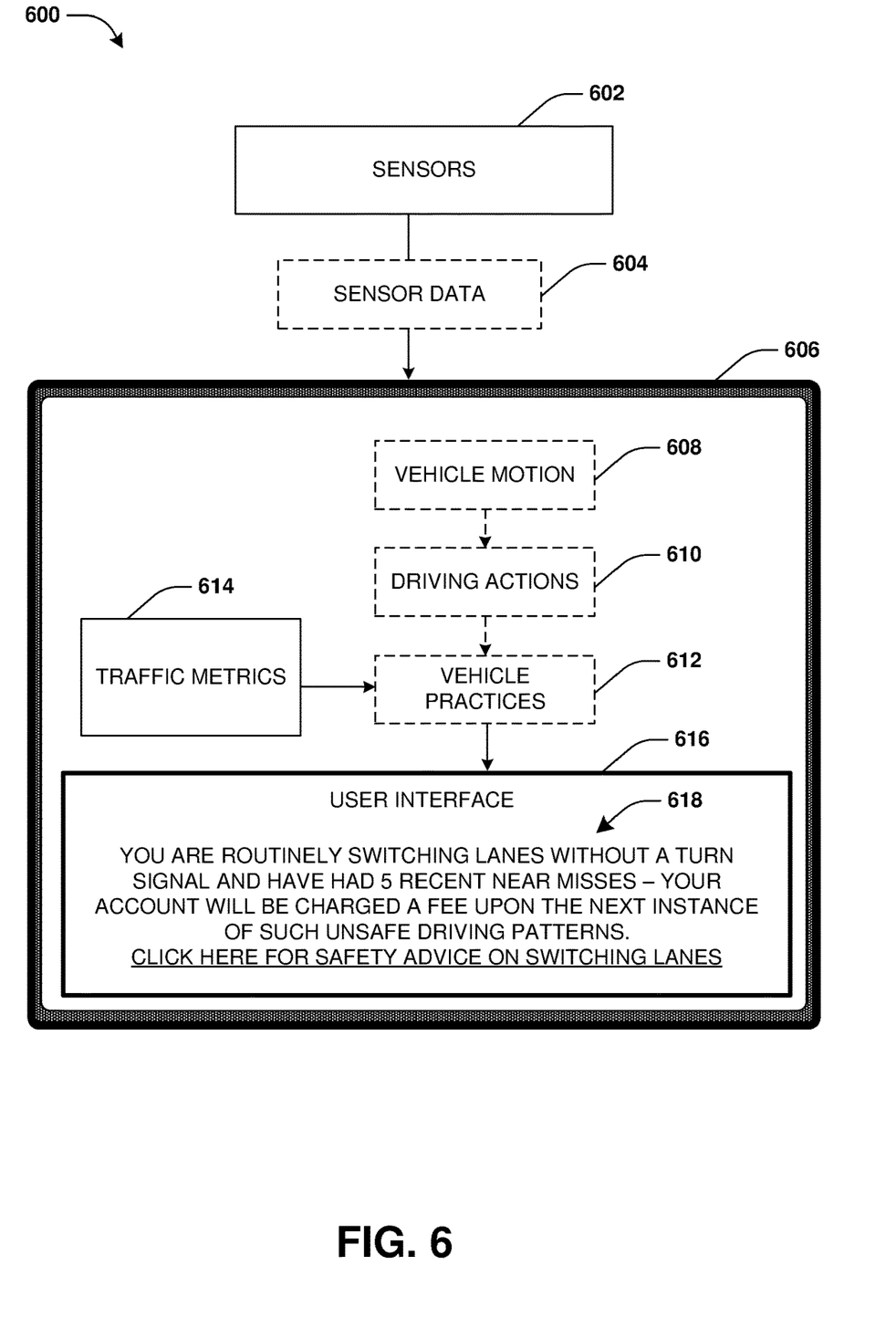
FIG. 6 is a component block diagram illustrating an example system for executing feedback actions based upon vehicle practices.

FIG. 6 illustrates an example of a system 600 for executing feedback actions based upon vehicle practices. A computing device 606 may obtain sensor data 604 from sensors 602 configured to collect the sensor data 604 associated with one or more vehicles, such as a vehicle associated with the computing device 606 (e.g., a mobile device within the vehicle, a vehicle computer of the vehicle, etc.). The computing device 606 processes the sensor data 604 to identify vehicle motion 608 of the vehicle, such as driving motion characteristics of the vehicle switching lanes and status information of turn signals of the vehicle. The computing device 606 processes the vehicle motion 608 to identify driving actions 610, such as the vehicle switching lanes without using a turn signal. The computing device 606 processes the driving actions 610 to determine vehicle practices 612, such as a vehicle practice where a driver of the vehicle routinely switches lanes without using turn signals. The vehicle practices 612 may be compared to traffic metrics 614, such as a safety traffic metric to reduce collisions from improper lane changes, to determine that a feedback action should be implemented upon a next instance of unsafe vehicle practices by the driver. Accordingly, the computing device 606 renders a user interface 616 comprising a warning 618 that the user will be charge a fee the next time the user switches lanes without using a turn signal. The warning 618 may comprise a link to instructions and/or a video on how to properly switch lanes.

Figure 7:
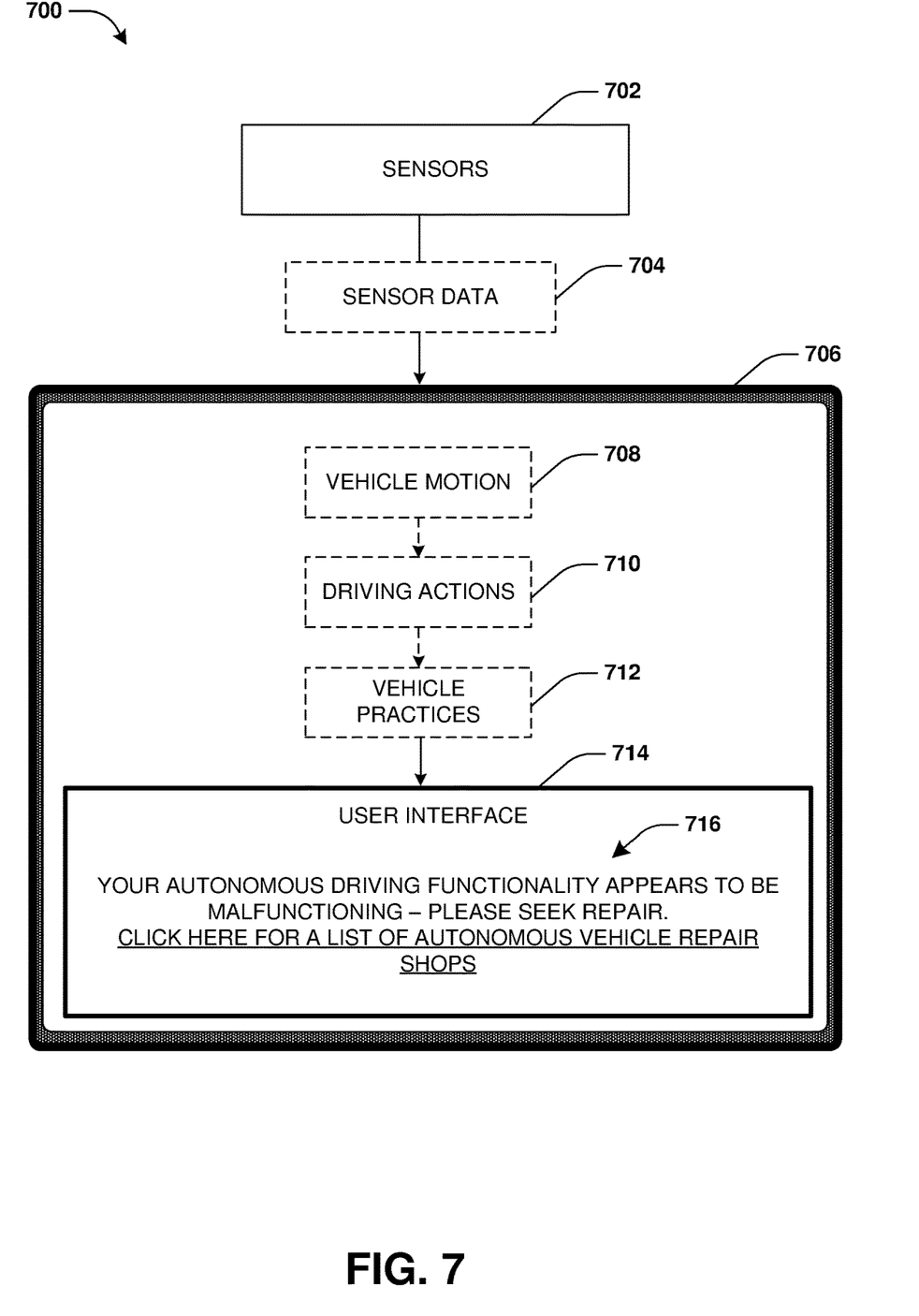
FIG. 7 is a component block diagram illustrating an example system for executing feedback actions based upon vehicle practices, where a malfunction is identified.

FIG. 7 illustrates an example of a system 700 for executing feedback actions based upon vehicle practices. A computing device 706 may obtain sensor data 704 from sensors 702 configured to collect the sensor data 704 associated with one or more vehicles, such as a vehicle associated with the computing device 706 (e.g., a mobile device within the vehicle, a vehicle computer of the vehicle, etc.). The computing device 706 processes the sensor data 704 to identify vehicle motion 708 of the vehicle, such as a determination that autonomous driving functionality of the vehicle is stopping in the middle of intersections at red lights instead of before the intersections. The computing device 706 processes the vehicle motion 708 to identify driving actions 710, such as the autonomous vehicle failing to stop in time for red lights. The computing device 706 processes the driving actions 710 to determine vehicle practices 712, such as a vehicle practice of the autonomous driving functionality routinely stopping at red lights within the middle of intersections. The computing device 706 may evaluate the vehicle practices 712 to identify a malfunction of the autonomous driving functionality. Accordingly, the computing device 706 renders a user interface 714 comprising an alert message 716 that the autonomous driving functionality is malfunctioning. The alert message 716 may comprise a link to a list of autonomous vehicle repair shops.

Figure 8:
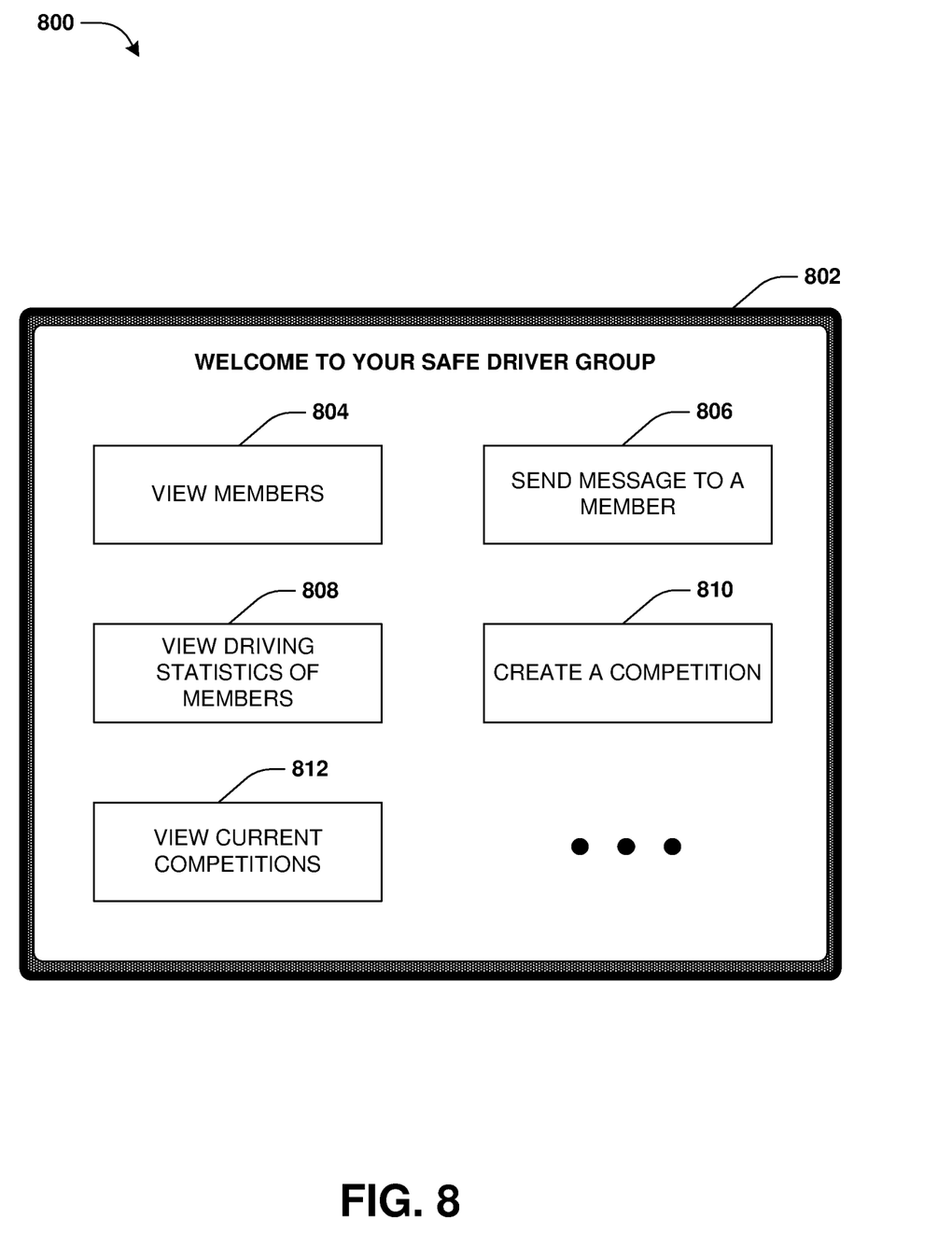
FIG. 8 is a component block diagram illustrating an example system for executing feedback actions based upon vehicle practices, where a user interface for a safe driver group is rendered on a display.

FIG. 8 illustrates an example of a system 800 for executing feedback actions based upon vehicle practices. A computing device is configured to evaluate vehicle practices of a plurality of users to identify a group of users that have driving practices above a safety threshold. The computing device creates a safe driver group comprising the group of users. The computing device renders a user interface through which computers of users of the safe driver group, such as a computer 802, can view various information about the safe driver group, such as the ability to view members 804, send a message to a member 806, view driving statistics of members 808 (e.g., view vehicle practices of vehicles of the users in the safe driver group), create a competition 810 (e.g., define rewards/punishments for completing a particular challenge such as to not run red lights for 3 weeks), view current competition progress by members, etc.

Figure 9:
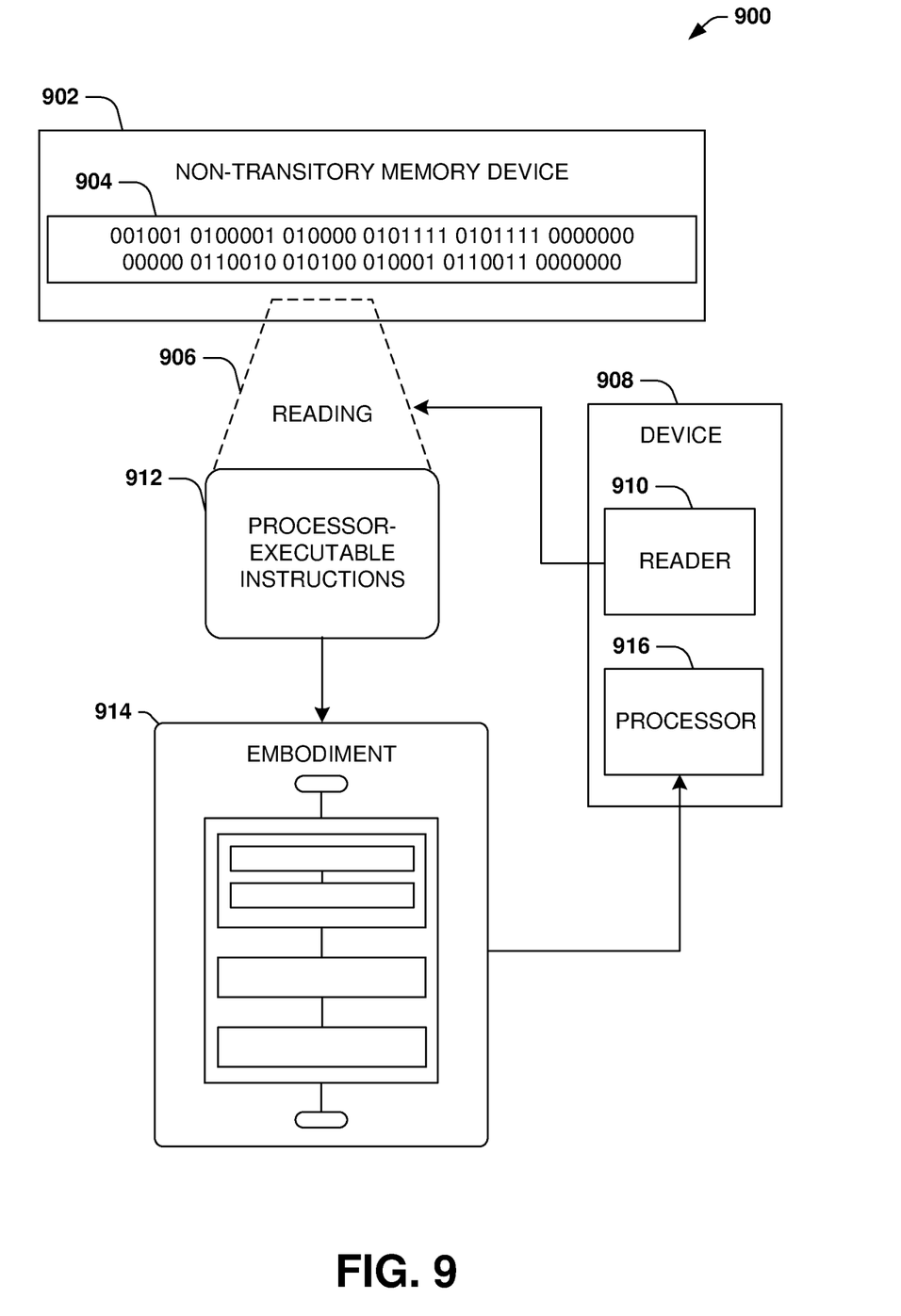
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 400 of FIG. 4, for example. In some embodiments, the processor-executable instructions 912 are configured to cause implementation of a system, such as at least some of the example system 500 of FIG. 5, at least some of the example system 600 of FIG. 6, at least some of the example system 700 of FIG. 7, and/or at least some of the example system 800 of FIG. 8, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a processor of a computing device, instructions that cause the computing device to perform operations, the operations comprising:
   establishing a connection with sensors configured to collect sensor data associated with one or more vehicles;
   receiving, over the connection, transmissions of sensor data from the sensors;
   synthesizing the sensor data to attribute at least some sensor data to vehicle motion of a vehicle, of a first user, in relation to other objects;
   synthesizing the vehicle motion to determine one or more driving actions of the vehicle;
   responsive to determining a threshold number of instances of the one or more driving actions, defining vehicle practices of the vehicle, corresponding to one or more driving habits of the first user of the vehicle, in relation to at least one of second vehicle practices of other vehicles or predefined vehicle practices based upon the one or more driving actions;
   determining a feedback action to execute to either reward the vehicle practices or incentivize a change in the vehicle practices;
   executing the feedback action, wherein the executing the feedback action comprises transmitting, over a computer network to a remote computing device, instructions for storing information in the remote computing device, wherein the instructions comprise at least one of authorization for the vehicle of the first user to access a restricted area, an adjustment command to adjust an insurance policy, a monetary payment command to add a first amount of money to a first account, or a monetary charge command to deduct a second amount of money from a second account;
   determining a second feedback action to execute to incentivize a change in the vehicle practices;
   adjusting the second feedback action to generate an adjusted feedback action, wherein the adjusting comprises imposing a first fine that at least one of (i) is determined based upon the vehicle being located in a school zone, or (ii) is determined based upon the vehicle being located in a residential neighborhood;
   executing the adjusted feedback action, wherein the executing the adjusted feedback action comprises sending a notification indicative of the first fine to one or more devices;
   evaluating at least some vehicle practices of a plurality of users comprising the first user, a second user and a third user;
   identifying, based upon the evaluating, a group of users that have driving practices above a safety threshold, wherein the group of users comprises the first user and the second user but not the third user; and
   responsive to the first user and the second user both being within the group of users that have driving practices above a safety threshold:
   creating, by a system, a safe driver group for users having driving practices above the safety threshold, wherein the system includes the first user and the second user but not the third user in the safe driver group based upon a determination that the first user and the second user each have driving practices above the safety threshold but the third user does not have driving practices above the safety threshold; and
   responsive to the system creating the safe driver group comprising the first user and the second user but not the third user, providing, to the users having driving practices above the safety threshold comprising the first user and the second user, access to at least one user interface populated with updates of one or more driving practices of two or more users comprised within the safe driver group, wherein the providing access comprises displaying the at least one user interface via a first device of the first user such that the first device of the first user displays information about one or more other users.

2. The method of claim 1, wherein the at least one user interface comprises at least one of a first object corresponding to viewing members, a second object corresponding to sending a message to members, a third object corresponding to viewing driving statistics of members, a fourth object corresponding to creating a competition, or a fifth object corresponding to viewing current competition progress.

3. The method of claim 1, comprising:
   generating a driving action recommendation for a driver to implement the change in the vehicle practices.

4. The method of claim 3, comprising:
outputting the driving action recommendation by at least one of rendering the driving action recommendation on a display of at least one computing device, controlling an audio device to play an audio message of the driving action recommendation, or transmitting the driving action recommendation as a message to a message account of the driver.

5. The method of claim 4, comprising:
evaluating subsequent vehicle practices of the driver to determine whether the driver implemented the change in the vehicle practices; and
outputting a message as a social network post regarding whether the driver implemented the change in the vehicle practices.

6. The method of claim 1, comprising:
determining that the vehicle is an autonomous vehicle implementing autonomous driving functionality;
evaluating the vehicle practices of the vehicle attributed to the implementation of the autonomous driving functionality to identify a malfunction of the autonomous vehicle, wherein the malfunction corresponds to a malfunctioning sensor; and
outputting an alert message of the malfunction.

7. The method of claim 6, comprising:
generating the alert message to comprise a link to a list of autonomous vehicle repair shops.

8. A computing device comprising:
a processor; and
memory comprising processor-executable instructions that when executed by the processor cause performance of operations, the operations comprising:
  establishing a connection with sensors configured to collect sensor data associated with vehicles;
  receiving, over the connection, transmissions of sensor data from the sensors;
  synthesizing the sensor data to attribute at least some sensor data to vehicle motion of a vehicle, of a first user, in relation to other objects;
  synthesizing the vehicle motion to determine one or more driving actions of the vehicle;
  defining vehicle practices of the vehicle in relation to at least one of second vehicle practices of other vehicles or predefined vehicle practices based upon the one or more driving actions;
  determining a feedback action to execute to either reward the vehicle practices or incentivize a change in the vehicle practices based upon how the vehicle practices affect at least one of traffic safety metrics or traffic flow metrics;
  executing the feedback action, wherein the executing the feedback action comprises transmitting, over a computer network to a remote computing device, instructions for storing information in the remote computing device, wherein the instructions comprise at least one of authorization for the vehicle of the first user to access a restricted area, an adjustment command to adjust an insurance policy, a monetary payment command to add a first amount of money to a first account, or a monetary charge command to deduct a second amount of money from a second account;
  determining a second feedback action to execute to incentivize a change in the vehicle practices;
  adjusting the second feedback action to generate an adjusted feedback action, wherein the adjusting comprises imposing a first fine that at least one of (i) is determined based upon the vehicle being located in a school zone, or (ii) is determined based upon the vehicle being located in a residential neighborhood;
  executing the adjusted feedback action;
  evaluating at least some vehicle practices of a plurality of users comprising the first user, a second user and a third user;
  identifying, based upon the evaluating, a group of users that have driving practices above a safety threshold, wherein the group of users comprises the first user and the second user but not the third user; and
  responsive to the first user and the second user being within the group of users that have driving practices above a safety threshold:
    creating a safe driver group for users having driving practices above the safety threshold, wherein the first user and the second user but not the third user are included in the safe driver group based upon a determination that the first user and the second user each have driving practices above the safety threshold but the third user does not have driving practices above the safety threshold; and
    responsive to creating the safe driver group comprising the first user and the second user but not the third user, providing, to the users having driving practices above the safety threshold comprising the first user and the second user, access to at least one user interface populated with updates of one or more driving practices of two or more users comprised within the safe driver group.

9. The computing device of claim 8, wherein the operations for executing the feedback action comprise:
evaluating the vehicle practices to determine a probability of an accident based upon:
  one or more types of one or more vehicle practices of the vehicle practices,
  one or more severities of the one or more vehicle practices of the vehicle practices, and
  one or more frequencies of the one or more vehicle practices of the vehicle practices; and
outputting a message of the probability of the accident.

10. The computing device of claim 9, wherein the one or more types of the one or more vehicle practices comprise at least one of running a red light, leaving a turn signal on, tailgating, switching lanes, blocking another vehicle from merging, driving below a speed limit, driving too close to another vehicle, having a near-miss accident, hitting an object, weaving into another lane while turning at a two lane turning intersection or weaving between lanes.

11. The computing device of claim 9, wherein the one or more severities of the one or more vehicle practices comprise running a red light after the red light has been red for a threshold period of time.

12. The computing device of claim 9, wherein the one or more frequencies of the one or more vehicle practices comprise at least one of running a red light a first number of times over a first period of time or switching lanes a second number of times over a second period of time.

13. The computing device of claim 9, wherein the one or more frequencies of the one or more vehicle practices comprise a number of occurrences of a vehicle practice over a period of time.

14. The computing device of claim 9, wherein the one or more severities of the one or more vehicle practices comprise violating a law after a condition that makes the law applicable to the vehicle has been present for a threshold period of time.

15. A non-transitory machine readable medium having stored thereon processor-executable instructions that when executed cause performance of operations, the operations comprising:
- establishing a connection with sensors configured to collect sensor data associated with vehicles;
- receiving, over the connection, transmissions of sensor data from the sensors;
- synthesizing the sensor data to attribute at least some sensor data to vehicle motion of a vehicle, of a first user, in relation to other objects;
- synthesizing the vehicle motion to determine one or more driving actions of the vehicle;
- responsive to determining a threshold number of instances of the one or more driving actions, defining vehicle practices of the vehicle, corresponding to one or more driving habits of a user of the vehicle, in relation to at least one of second vehicle practices of other vehicles or predefined vehicle practices based upon the one or more driving actions;
- evaluating the vehicle practices against traffic metrics to determine a first feedback action to incentivize a change in first vehicle practices of the vehicle practices for achieving the traffic metrics and to determine a second feedback action to reward second vehicle practices of the vehicle practices;
- determining demographic information associated with the user of the vehicle;
- adjusting the first feedback action based upon the demographic information to generate an adjusted feedback action, wherein the adjusting comprises imposing a first fine that at least one of (i) is determined based upon the vehicle being located in a school zone, or (ii) is determined based upon the vehicle being located in a residential neighborhood;
- executing the adjusted feedback action and executing the second feedback action,
- wherein the executing the adjusted feedback action comprises sending a notification, indicative of the first fine, to a device of the user,
- wherein the executing the second feedback action comprises transmitting, over a computer network to a remote computing device that manages a restricted area, authorization for the vehicle of the first user to access the restricted area;
- evaluating at least some vehicle practices of a plurality of users comprising the first user, a second user and a third user;
- identifying, based upon the evaluating the at least some vehicle practices of the plurality of users, a group of users that have driving practices above a safety threshold, wherein the group of users comprises the first user and the second user but not the third user; and
- responsive to the first user and the second user both being within the group of users that have driving practices above a safety threshold:
- creating, by a system, a safe driver group for users having driving practices above the safety threshold, wherein the system includes the first user and the second user but not the third user in the safe driver group based upon a determination that the first user and the second user each have driving practices above the safety threshold but the third user does not have driving practices above the safety threshold; and
- responsive to the system creating the safe driver group comprising the first user and the second user but not the third user, providing, to the users having driving practices above the safety threshold comprising the first user and the second user, access to at least one user interface populated with updates of one or more driving practices of two or more users comprised within the safe driver group, wherein the providing access comprises displaying the at least one user interface via a first device of the first user such that the first device of the first user displays information about one or more other users.

16. The non-transitory machine readable medium of claim 15, wherein the operations comprise:
- creating a first mapping that maps the traffic metrics to one or more vehicle practices, wherein the first mapping is indicative of a first relationship corresponding to a first likelihood of a first vehicle practice affecting a first traffic metric and a second relationship corresponding to a second likelihood of a second vehicle practice affecting a second traffic metric;
- creating a second mapping that maps the one or more vehicle practices to feedback actions, wherein the second mapping is indicative of a third relationship corresponding to a third likelihood of a third feedback action affecting the first vehicle practice and a fourth relationship corresponding to a fourth likelihood of a fourth feedback action affecting the second vehicle practice;
- utilizing a neural network to evaluate the first mapping and the second mapping to determine an adjustment to the feedback actions that will achieve the traffic metrics; and
- adjusting at least one of the feedback actions based upon the adjustment to create at least one adjusted feedback action for execution.

17. The non-transitory machine readable medium of claim 15, wherein the first fine is determined to be sufficient for the user to care based upon a level of wealth of the user.

18. The non-transitory machine readable medium of claim 15, wherein the first fine is determined based upon the vehicle being located in a school zone.

19. The non-transitory machine readable medium of claim 15, wherein the first fine is determined based upon the vehicle being located in a residential neighborhood.

20. The non-transitory machine readable medium of claim 15, wherein the operations comprise:
- evaluating the vehicle practices of the vehicle to determine a probability of an accident based upon:
  - one or more types of one or more vehicle practices of the vehicle practices,
  - one or more severities of the one or more vehicle practices of the vehicle practices, and
  - one or more frequencies of the one or more vehicle practices of the vehicle practices; and
- outputting a message of the probability of the accident.

* * * * *